(12) United States Patent
Tada et al.

(10) Patent No.: US 10,232,900 B2
(45) Date of Patent: Mar. 19, 2019

(54) SADDLE-RIDE-TYPE VEHICLE

(71) Applicant: HONDA MOTOR CO., LTD., Tokyo (JP)

(72) Inventors: Masashi Tada, Wako (JP); Yuji Noguchi, Wako (JP); Yusuke Inoue, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 15/071,759

(22) Filed: Mar. 16, 2016

(65) Prior Publication Data
US 2016/0288851 A1    Oct. 6, 2016

(30) Foreign Application Priority Data

Mar. 31, 2015   (JP) .................. 2015-073613

(51) Int. Cl.
| | | |
|---|---|---|
| *B62J 1/08* | (2006.01) | |
| *B62J 1/12* | (2006.01) | |
| *B62K 11/00* | (2006.01) | |
| *B62K 19/46* | (2006.01) | |
| *B62K 11/02* | (2006.01) | |
| *B62K 19/30* | (2006.01) | |

(52) U.S. Cl.
CPC . *B62J 1/08* (2013.01); *B62J 1/12* (2013.01); *B62K 11/00* (2013.01); *B62K 11/02* (2013.01); *B62K 19/30* (2013.01); *B62K 19/46* (2013.01)

(58) Field of Classification Search
CPC ........ B62K 19/16; B62K 19/18; B62K 19/30; B62K 19/36; B62K 19/40; B62K 2700/20; B62J 1/08; B62J 1/085; B62J 1/28

See application file for complete search history.

(56) References Cited

U.S. PATENT DOCUMENTS

| | | | |
|---|---|---|---|
| 9,120,520 B2* | 9/2015 | Miyamoto | ............... B62J 17/00 |
| 9,845,127 B2* | 12/2017 | Tada | ........................... B62J 1/08 |
| 9,902,458 B2* | 2/2018 | Matsushima | .......... B62K 11/04 |
| 2004/0129482 A1* | 7/2004 | Takenaka | ............... B62K 19/30 |
| | | | 180/309 |

(Continued)

FOREIGN PATENT DOCUMENTS

| | | |
|---|---|---|
| EP | 2639145 A1 | 9/2013 |
| JP | 1-223091 A | 9/1989 |

(Continued)

*Primary Examiner* — Joseph M Rocca
*Assistant Examiner* — Daniel S Yeagley
(74) *Attorney, Agent, or Firm* — Birch, Stewart, Kolasch & Birch, LLP (57) ABSTRACT

A saddle-ride-type vehicle where the degree of freedom in layout of parts is increased by making use of a space formed below a rider's seat. The saddle-ride-type vehicle includes a main frame extending rearwardly in a longitudinal direction of a vehicle and downwardly from a head pipe. A seat frame extends rearwardly in the longitudinal direction of the vehicle from the main frame with a rider's seat supported on the seat frame from below. The seat frame is disposed in a frontward inclined manner toward the main frame wherein the seat frame becomes away from a seat bottom surface of the rider's seat thus forming a space below the seat bottom surface with a seat support member being disposed in the space.

7 Claims, 7 Drawing Sheets

(56) References Cited

U.S. PATENT DOCUMENTS

| | | | |
|---|---|---|---|
| 2006/0061157 A1 | 3/2006 | Yokomizo | |
| 2007/0023216 A1 | 2/2007 | Isayama | |
| 2008/0179151 A1* | 7/2008 | Chisuwa | B62J 35/00 188/379 |
| 2009/0194355 A1 | 8/2009 | Yamamoto et al. | |
| 2012/0097463 A1* | 4/2012 | Iwata | B60K 1/00 180/65.1 |
| 2012/0145470 A1* | 6/2012 | Fujiyama | B62J 37/00 180/219 |
| 2012/0211295 A1* | 8/2012 | Nagai | B60T 8/3225 180/219 |
| 2012/0261203 A1* | 10/2012 | Oshima | B62J 37/00 180/69.4 |
| 2013/0270022 A1* | 10/2013 | Matsuda | B62K 11/04 180/220 |
| 2016/0137249 A1* | 5/2016 | Sasage | B62J 6/18 180/219 |

FOREIGN PATENT DOCUMENTS

| | | | |
|---|---|---|---|
| JP | 2008-126902 A | 6/2008 | |
| JP | 2011-207372 A | 10/2011 | |
| JP | 2012-91595 A | 5/2012 | |
| JP | 2013-071682 A | 4/2013 | |
| JP | 2013-147077 A | 8/2013 | |
| WO | WO-2015033425 A1 * | 3/2015 | B62K 11/04 |

\* cited by examiner

SADDLE-RIDE-TYPE VEHICLE

CROSS-REFERENCE TO RELATED APPLICATIONS

The present application claims priority under 35 USC 119 to Japanese Patent Application No. 2015-073613 filed Mar. 31, 2015 the entire contents of which are hereby incorporated by reference.

BACKGROUND OF THE INVENTION

1. Field of the Invention

The present invention relates to a saddle-ride-type vehicle, and more particularly to a saddle-ride-type vehicle where a rider's seat is supported on a seat frame.

2. Description of Background Art

In a conventional motorcycle, such as a saddle-ride-type vehicle, a structure has been proposed wherein front ends of a pair of left and right seat frames are disposed approximately parallel to a rider's seat and are fastened to a main cross member by means of fastening bolts. See, for example, JP-A-2013-71682. The seat frame includes a horizontal member formed substantially horizontally so as to hold the rider's seat with a connecting member inclined downwardly toward a main frame from the horizontal member and connected to the main frame on a front side of the horizontal member.

In the conventional structure where the seat frame is disposed approximately horizontally so as to hold the rider's seat as described above, there exists a drawback that a space layout below the rider's seat is restricted.

SUMMARY AND OBJECTS OF THE INVENTION

The invention has been made in view of the above-mentioned circumstances. It is an object of an embodiment of the present invention to provide a saddle-ride-type vehicle where the degree of freedom in layout of parts is increased by making use of a space formed below a rider's seat.

To achieve the above-mentioned object, according to an embodiment of the present invention a saddle-ride-type vehicle includes:

a main frame extending rearwardly in a longitudinal direction of a vehicle and downward from a head pipe;

a seat frame extending rearwardly in the longitudinal direction of the vehicle from the main frame; and a rider's seat supported on the seat frame from below, wherein:

the seat frame is disposed in a frontward inclined manner toward the main frame such that the seat frame becomes away from a seat bottom surface of the rider's seat thus forming a space below the seat bottom surface, and a seat support member is disposed in the space.

According to an embodiment of the present invention, the seat support member is configured to gradually increase a height thereof toward one end side in the longitudinal direction of the vehicle as viewed in a side view of the vehicle, and the space has a largest storage space adjacent to the one end side.

According to an embodiment of the present invention, the largest storage space is disposed between the seat support member and a fuel tank, and a support seat surface which supports the seat bottom surface thereon is formed on an upper portion of the fuel tank.

According to an embodiment of the present invention, an electric component is arranged in the largest storage space.

According to an embodiment of the present invention, the seat support member includes an upper surface wall extending in a lateral direction of the vehicle and leg walls extending downwardly in a vertical direction of the vehicle from both left and right end sides of the upper surface wall, and the leg walls are mounted on the seat frame.

According to an embodiment of the present invention, a fuel injection device is disposed below the upper surface wall.

According to an embodiment of the present invention, an air cleaner element is disposed below the seat support member, and an opening portion is formed in the seat support member at a position above the air cleaner element.

According to an embodiment of the present invention, a fixing portion on which an electric component is mountable is formed on the seat support member.

According to an embodiment of the present invention, the seat support member is formed by molding using a fiber reinforced resin.

According to an embodiment of the present invention, the seat frame is disposed in a frontward inclined manner toward the main frame such that the seat frame becomes away from the seat bottom surface of the rider's seat thus forming the space below the seat bottom surface, and the seat support member can be disposed in the space. As a result, the space can be used as a part storage space. Thus, the degree of freedom in layout of parts can be increased.

According to an embodiment of the present invention, the seat support member is configured to gradually increase a height thereof toward the one end side in the longitudinal direction of the vehicle as viewed in a side view of the vehicle. Thus, the largest storage space can be formed on the one end side of the seat support member. Accordingly, a maximum storage amount can be ensured by using the largest storage space disposed adjacent to the one end side as a part storage space.

According to an embodiment of the present invention, the largest storage space is disposed between the seat support member and the fuel tank. Thus, a side surface of the fuel tank can be used as a partitioning wall surface of the largest storage space on a front side. Further, the support seat surface which supports the seat bottom surface thereon is formed on the upper portion of the fuel tank. Thus, the seat bottom surface can be used as a partitioning wall surface of the largest storage space on an upper side. Accordingly, with respect to the largest storage space, the wall surfaces which partition the space are formed by making use of the fuel tank and the rider's seat. Thus, the part storage space can be formed without providing particular members.

According to an embodiment of the present invention, an electric component is arranged in the largest storage space. Thus, heavy objects can be collectively arranged in the vicinity of the fuel tank. As a result, the concentration of heavy objects can be realized thus providing the vehicle having a favorable weight balance.

According to an embodiment of the present invention, the seat support member includes the upper surface wall extending in the lateral direction of the vehicle and the leg walls extending downwardly in the vertical direction of the vehicle from both left and right end sides of the upper surface wall. Thus, the seat bottom surface can be supported by the upper surface wall in a face contact manner whereby the rider's seat can be stably supported. Further, the leg walls are mounted on the seat frame. Thus, the seat support member is directly fixed to the vehicle body frame whereby the rider's seat supporting rigidity can be increased.

According to an embodiment of the present invention, the fuel injection device is disposed below the upper surface wall of the seat support member. Thus, the fuel injection device can be protected by the seat support member.

According to an embodiment of the present invention, the air cleaner element is disposed below the seat support member. Thus, the air cleaner element can be protected by the seat support member. Further, the opening portion is formed in the seat support member at a portion positioned above the air cleaner element. Thus, a space on an upper side of the air cleaner element can be increased whereby the flow of air can be improved thus improving intake efficiency.

According to an embodiment of the present invention, the fixing portion on which an electric component is mountable is formed on the seat support member. Thus, the particular members for holding the electric component in the storage space are not necessary whereby the number of parts can be reduced and the vehicle can be miniaturized.

According to an embodiment of the present invention, the seat support member is formed by molding using a fiber reinforced resin. Thus, the strength of the seat support member can be increased and, at the same time, the weight of the seat support member can be reduced. Further, due to the reduction of weight of the seat support member arranged on an upper portion of the vehicle, lowering of heavy objects of the vehicle is accelerated thus providing the vehicle having a favorable weight balance.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, a motorcycle according to an embodiment of the invention is explained with reference to FIG. 1 to FIG. 8. The drawings are viewed in the direction of symbols and, in the explanation made hereinafter, directions such as "front," "rear," "left," "right," "up" and "down" are described in accordance with directions as viewed from a rider. In the drawings, symbol Fr indicates a front side of the vehicle, symbol Rr indicates a rear side of the vehicle, symbol L indicates a left side of the vehicle, symbol R indicates a right side of the vehicle, symbol U indicates an upper side of the vehicle, and symbol D indicates a lower side of the vehicle. Further, directions of respective parts of the motorcycle are also described in the same manner as described above.

Figure 1:
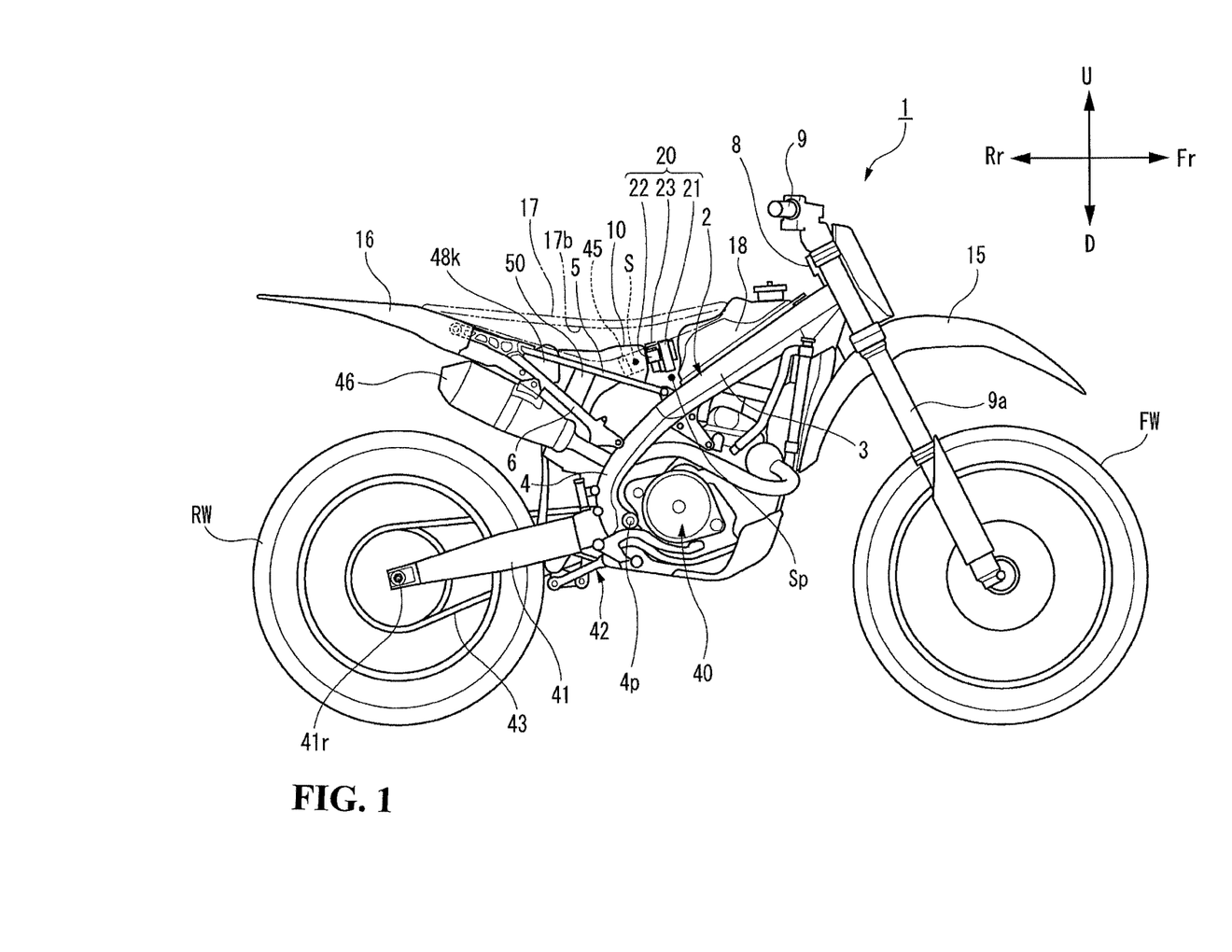
FIG. 1 is a right side view of a motorcycle which is a saddle-ride-type vehicle according to the invention in a state where a cover member is removed.

As shown in FIG. 1, a vehicle body frame 2 which is a skeletal part of the motorcycle 1 includes a pair of main frames 3 which extends obliquely downwardly from a head pipe 8 toward a rear side in the longitudinal direction of the vehicle; pivot frames 4 which are connected to a rear side of the main frames 3 and are positioned behind an engine 40; seat frames 5 which extend rearwardly and upwardly from rear end portions of the main frames 3 and support a rider's seat 17; support frames 6 which extend rearwardly and upwardly from the pivot frames 4 and are connected to rear ends of the seat frames 5 and the like.

A front fork 9a which is connected to the head pipe 8 is mounted on a front portion of the vehicle, a front wheel FW is mounted on a lower end portion of the front fork 9a, and a handle bar 9 is mounted on an upper end portion of the front fork 9a.

A front portion of a swing arm 41 is mounted on the pivot frames 4 in a vertically swingable manner using a pivot shaft 4p as a fulcrum. A rear wheel RW is rotatably supported on a rear end support shaft 41r mounted on the swing arm 41. The swing arm 41 is supported by a rear shock absorber 42 in a desired manner. The rear wheel RW is driven by a chain 43 extending between and wound around a drive sprocket (not shown in the drawing) disposed on an engine 40 side and a driven sprocket (not shown in the drawing) supported on a rear wheel RW side.

In this embodiment, a fuel tank 18 is arranged between the main frames 3 in front of the rider's seat 17. As cover members, a front fender 15 which covers an upper portion of the front wheel FW and a rear fender 16 which corresponds to the rear wheel RW are provided. Further, although not shown in the drawing, as the cover members, for example, a top shelter which covers an upper portion of the fuel tank 18, a shroud which covers lateral sides of the fuel tank from lateral sides of a radiator and covers a lower side of a front half portion of the rider's seat, side covers 19 which cover the lateral sides of the vehicle behind the shroud (see FIG. 7) and, further, a muffler cover which covers a muffler 46 and the like are provided.

Hereinafter, the embodiment is explained with reference to FIG. 2 to FIG. 6 which show the respective parts of the motorcycle 1 in an enlarged manner or in an exploded manner.

Figure 2:
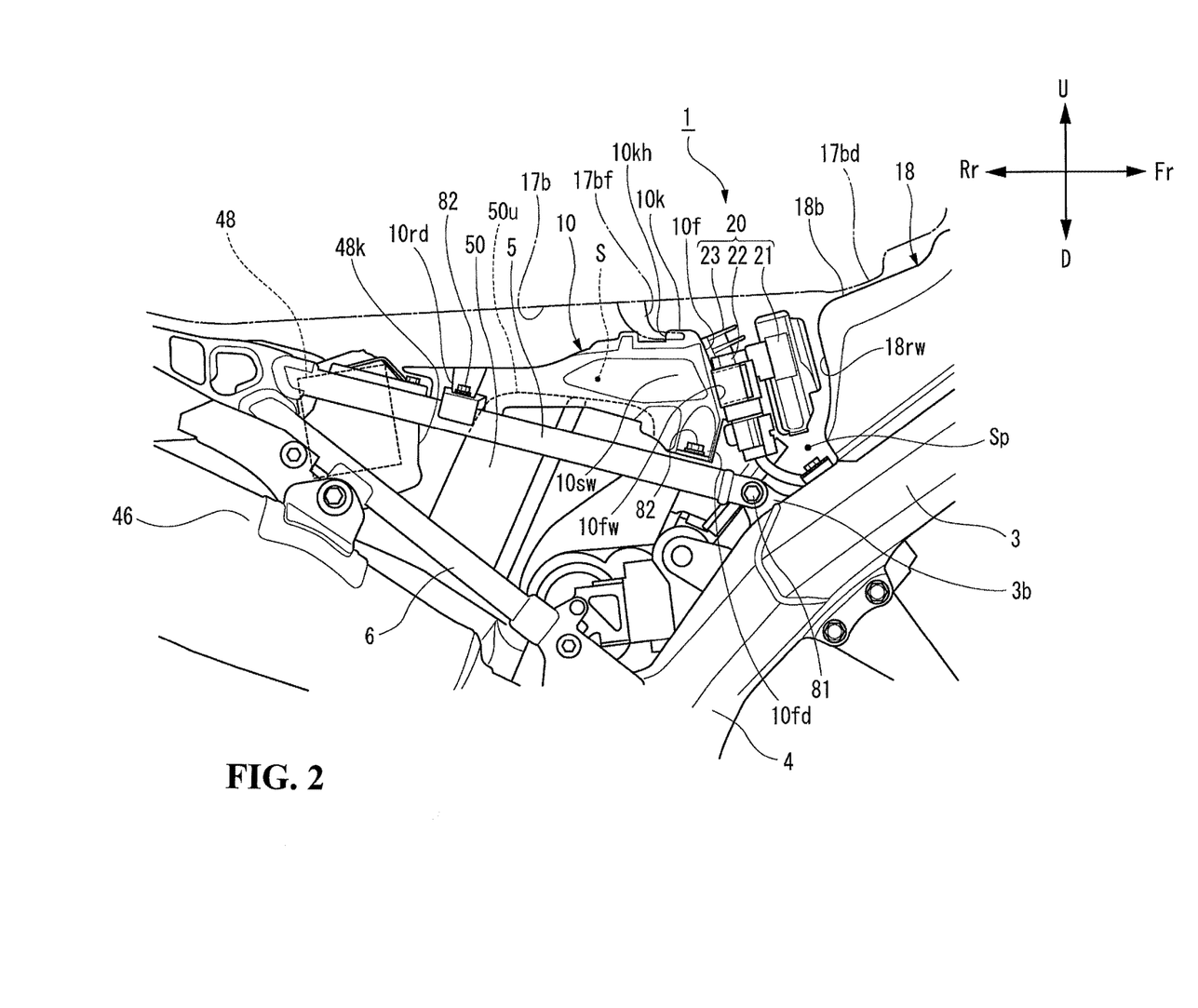
FIG. 2 is an enlarged side view of an essential part of the motorcycle shown in FIG. 1.

In this embodiment, as shown in FIG. 2 in an enlarged manner, each seat frame 5 is disposed in a frontward inclined manner such that the seat frame 5 becomes away from a seat bottom surface 17b of the rider's seat 17. The seat frame 5 extends in a straight line manner toward a fixing bracket 3b mounted on a rear portion of the main frame 3, and is fixed to the main frame 3 by means of a frame fixing bolt 81. Accordingly, a space S is formed between the seat bottom surface 17b and the seat frames 5 disposed below the seat bottom surface 17b, and a seat support member 10 is disposed in the space S. More specifically, the seat support member 10 is mounted on the seat frames 5 so as to hold the seat bottom surface 17b.

Figure 3:
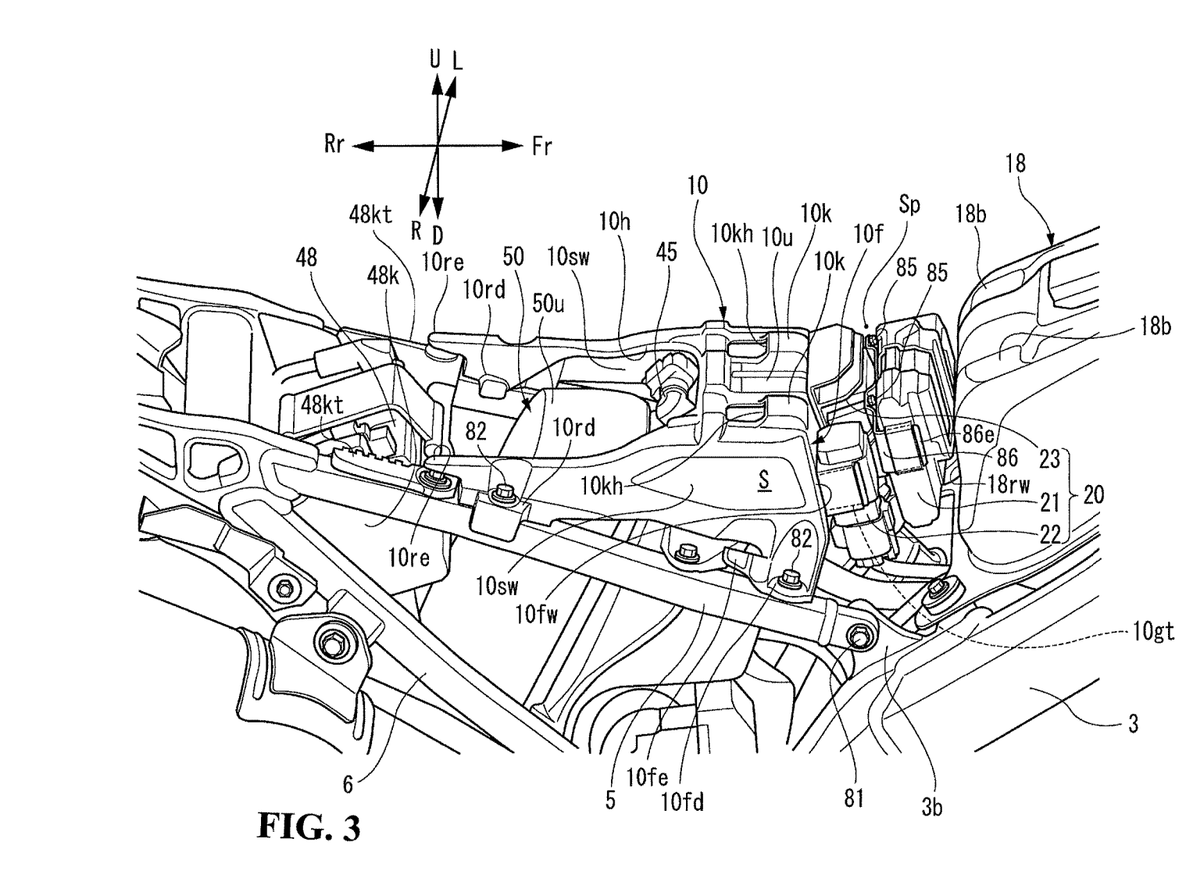
FIG. 3 is a perspective view of an essential part of the motorcycle shown in FIG. 1.

As shown in FIG. 3, the seat support member 10 is configured to gradually increase a height thereof toward one end side 10f on a front side in the longitudinal direction of the vehicle as viewed in a side view of the vehicle. The seat support member 10 has an upper surface wall 10u which extends in the lateral direction of the vehicle, and has a pair of left and right leg walls 10sw which extends downwardly from both left and right end sides of the upper surface wall 10u. Further, a front portion mounting portion 10fd and a rear portion mounting portion 10rd of the leg wall 10sw are mounted on the seat frame 5 by means of a mounting bolt 82.

In this embodiment, the seat support member 10 is formed by molding using a light-weighted and high-strength fiber reinforced resin as a material.

Figure 4:
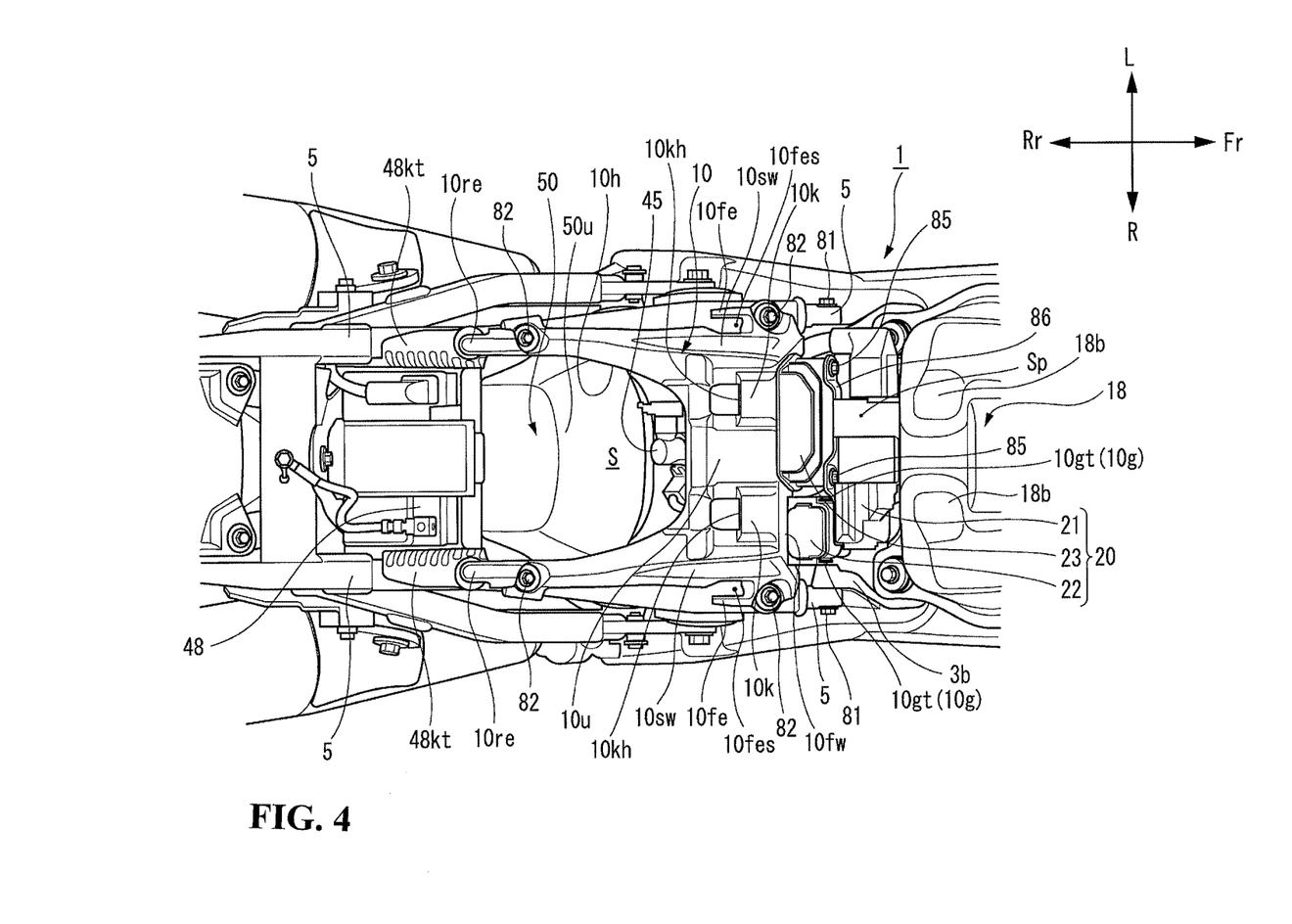
FIG. 4 is an enlarged plan view of an essential part of the motorcycle shown in FIG. 1.

In this embodiment, as shown in FIGS. 3 and 4, a fuel injection device 45 is positioned below the upper surface wall 10u. Accordingly, an upper side of the fuel injection device 45 is guarded by the upper surface wall 10u and is covered by the seat bottom surface 17b. Further, in the fuel injection device 45, the leg walls 10sw are positioned on both left and right sides of the fuel injection device 45, and both left and right sides of the fuel injection device 45 are guarded by the leg walls 10sw respectively.

As shown in FIGS. 3 and 4, an air cleaner element 50 is arranged behind the fuel injection device 45 in the longitudinal direction of the vehicle. The air cleaner element 50 is arranged below a rear side of the seat support member 10.

An opening portion 10h is formed in the seat support member 10 at a position facing an upper portion 50u of the air cleaner element 50 in an opposed manner. As shown in FIG. 4, the opening portion 10h is formed into a shape where a notched opening opens toward a rear side in the longitudinal direction of the vehicle as viewed in a plan view. More specifically, the opening portion 10h is opened from a rear end edge of the upper surface wall 10u to rear end extending portions 10re of the left and right leg walls 10sw.

In this embodiment, the seat support member 10 includes a front side wall 10fw which forms the front one end side 10f. The front side wall 10fw is disposed at a position substantially equal to a position where a distance between the seat frames 5 and the seat bottom surface 17b becomes maximum. Accordingly, the front side wall 10fw is arranged adjacent to a largest storage space Sp having a largest distance in the vertical direction in the space S formed between the seat frames 5 and the seat bottom surface 17b.

With respect to the largest storage space Sp, the front side wall 10fw of the seat support member 10 and a rear side surface 18rw of the fuel tank 18 form wall surfaces for defining the space in the longitudinal direction of the vehicle. Further, at least an upper side of the largest storage space Sp is covered by the seat bottom surface 17b in the vertical direction. A support seat surface 18b for supporting the seat bottom surface 17b is formed on an upper portion of the fuel tank 18. With such a configuration, by merely placing a front contact portion 17bd (see FIG. 6) of the seat bottom surface 17b on the support seat surface 18b formed on an upper portion of the fuel tank 18, it is possible to use the seat bottom surface 17b as an upper wall surface for forming the largest storage space Sp.

In this embodiment, as described previously, the seat support member 10 has the upper surface wall 10u which extends in the lateral direction of the vehicle. With such a configuration, the upper surface wall 10u is engaged with the seat bottom surface 17b so that a center region of the rider's seat 17 can be supported with certainty. More specifically, on the upper surface wall 10u, a pair of seat engaging portions 10k which engages with a pair of left and right engaging hooks 17bf (see FIG. 6) mounted on the seat bottom surface 17b in a projecting manner is mounted.

Figure 6:
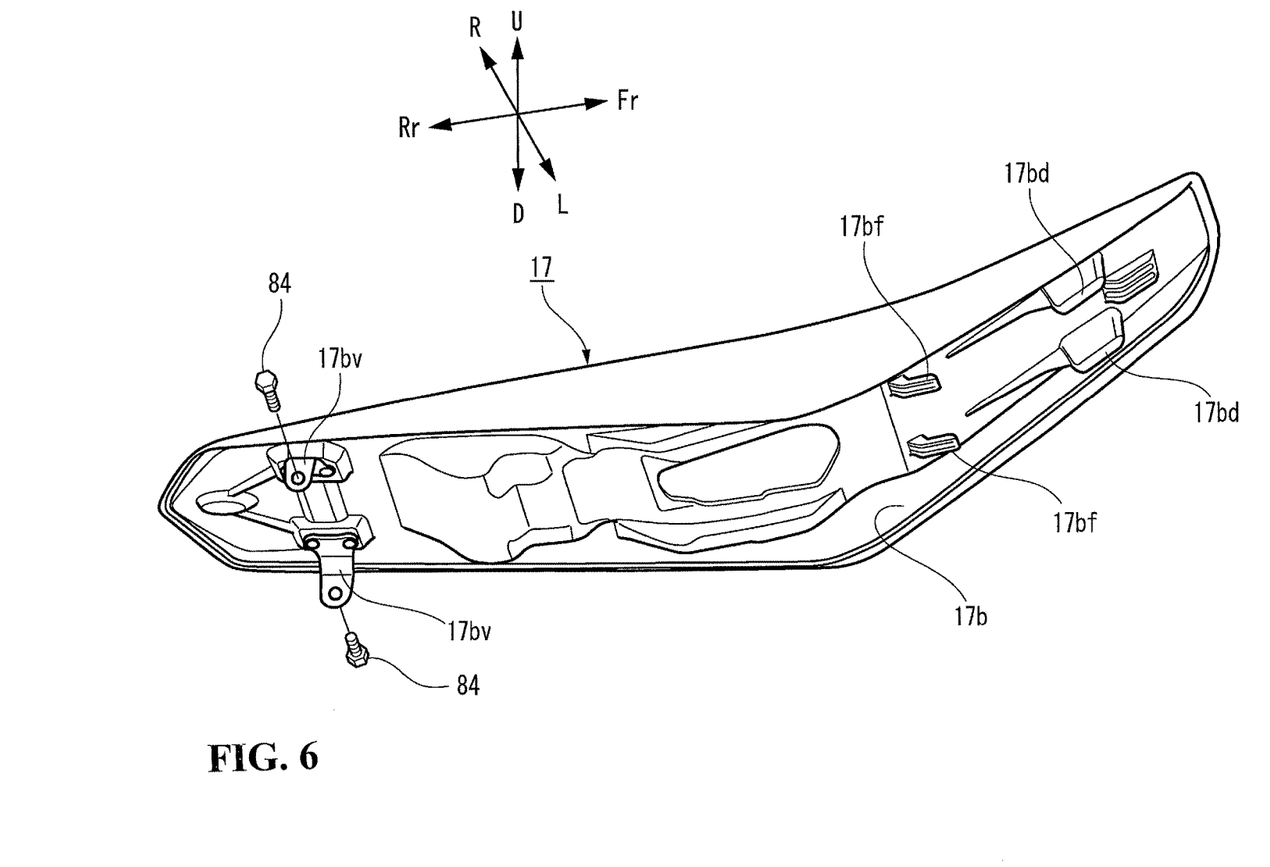
FIG. 6 is a perspective view of a back side of a rider's seat mounted on the motorcycle shown in FIG. 1.

In this embodiment, the engaging hook 17bf adopts a hook-shaped projection structure where the engaging hook 17b f extends downwardly from the seat bottom surface 17b and extends frontward in the longitudinal direction of the vehicle (see FIGS. 2 and 6). On the other hand, the seat engaging portion 10k has an opening 10kh which opens toward a rear side in the longitudinal direction of the vehicle on a wall surface of the upper surface wall 10u which projects upwardly to a greater extent relative to other portions of the upper surface wall 10u (see FIGS. 2 and 3).

Accordingly, in assembling the rider's seat 17, the engaging hooks 17bf are inserted into the seat engaging portions 10k and, at the same time, the front contact portion 17bd of the seat bottom surface 17b is placed on the support seat surface 18b of the fuel tank 18, for example. Due to such an operation, the rider's seat 17 is positioned in a temporarily fixed state. Thereafter, the rider's seat 17 is fixed to the vehicle body frame such that seat fixing screws 84 are threadedly engaged with seat brackets 17bv which are formed on a rear portion of the seat bottom surface 17b. In this manner, by adopting the structure where the seat engaging portions 10k which are engaged with the seat bottom surface 17b are formed on the upper surface wall 10u of the seat support member 10, the seat bottom surface 17b is engaged with the seat support member 10 with certainty. Thus, the positional displacement of the rider's seat 17 can be prevented.

Figure 5:
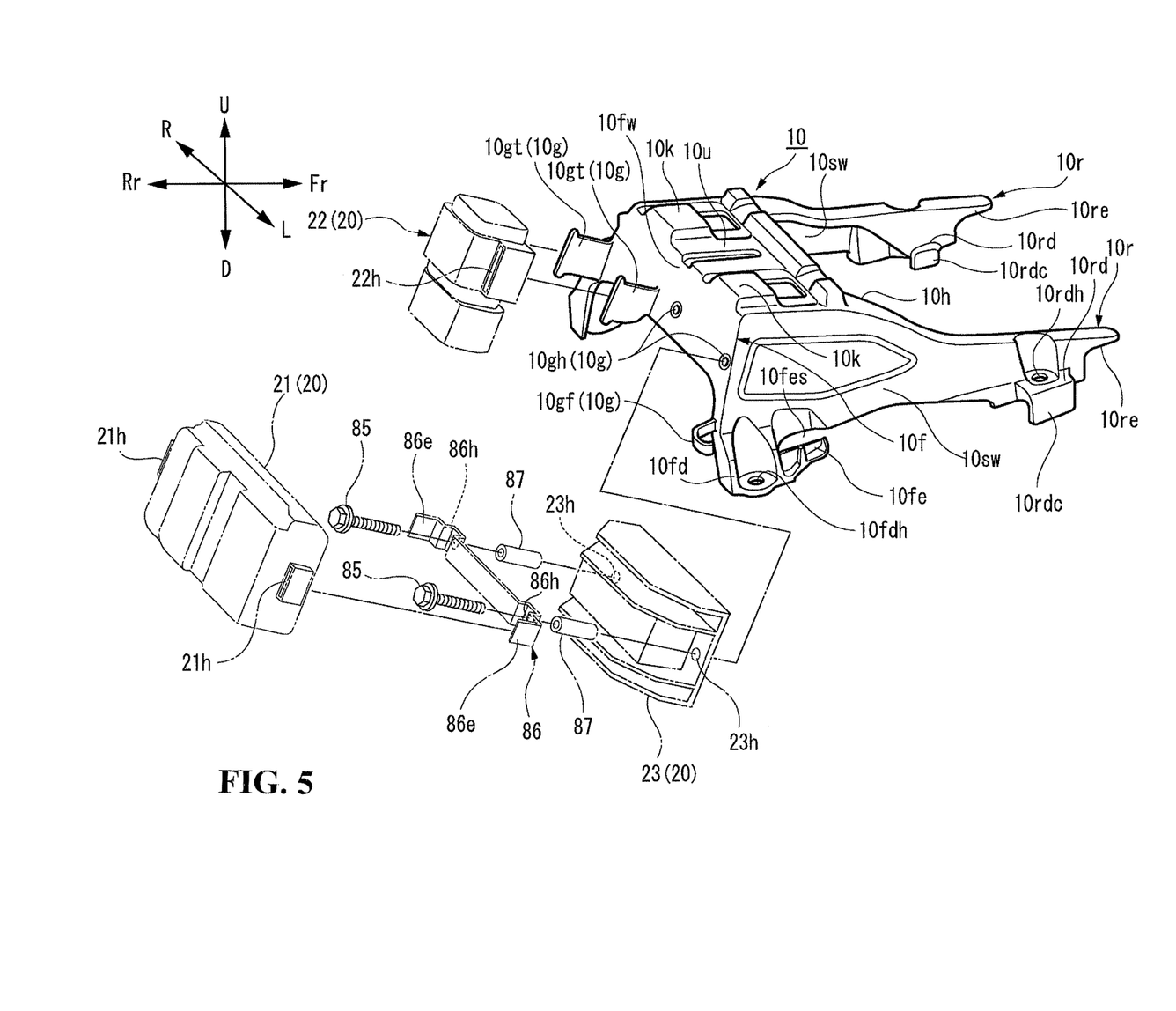
FIG. 5 is a perspective view of a back side of a seat support member of the motorcycle shown in FIG. 1.

Further, the largest storage space Sp provides a large space in which electric components 20 can be arranged. As shown in FIG. 5, a fixing portion 10g on which the plurality of electric components 20 are mounted is formed on the front side wall 10fw of the seat support member 10 in the longitudinal direction of the vehicle. The fixing portion 10g has a pair of projecting lugs 10gt which projects frontward on a right side thereof, and has a pair of screw fixing portions 10gh with which screw members 85 can be engaged on a left side thereof. Further, the seat support member 10 includes a hook-shaped engaging projection 10gf with which a wire harness and the like are engaged.

As the electric components 20, for example, electronic parts such as an ECU 21, a relay switch 22 and a regulator 23 can be mounted. As shown in FIG. 5, the relay switch 22 is supported on the projections 10gt. More specifically, the relay switch 22 has slit-shaped mounting holes 22h corresponding to the projections 10gt respectively, and is supported in a state where the projections 10gt are inserted into the mounting holes 22h respectively.

The regulator 23 is fixed to the seat support member 10 by making the screw members 85 pass through mounting holes 23h and threadedly engage with the screw fixing portions 10gh. The screw members 85 can simultaneously fix a fixing bracket 86 provided for mounting the ECU 21 on the regulator 23. The screw members 85 are threadedly engaged with the screw fixing portions 10gh respectively such that the respective screw members 85 penetrate bracket through holes 86h formed in the fixing bracket 86 and, further, penetrate distance adjusting sleeves 87 and the fixing bracket 86. Further, a fixing lug 86e which is bent toward a front side in the longitudinal direction of the vehicle is formed on both left and right ends of the fixing bracket 86, and the ECU 21 is mounted on the regulator 23 in a state where the fixing lugs 86e are inserted into mounting holes 21h formed in left and right ends of the ECU 21.

As shown in FIG. 5, front portion mounting holes 10fdh through which the mounting bolts 82 are threaded into the seat frame 5 are formed in the front portion mounting portions 10df of the seat support member 10, and projecting lugs 10fe which extend rearwardly in the longitudinal direction of the vehicle are formed on the front portion mounting portion 10fd behind the front portion mounting holes 10fdh. The projecting lugs 10fe are disposed on both left and right sides (see FIG. 3), and a gap 10fes (see FIGS. 4 and 5) is formed between the projecting lug 10fe and the leg wall 10sw.

Figure 7:
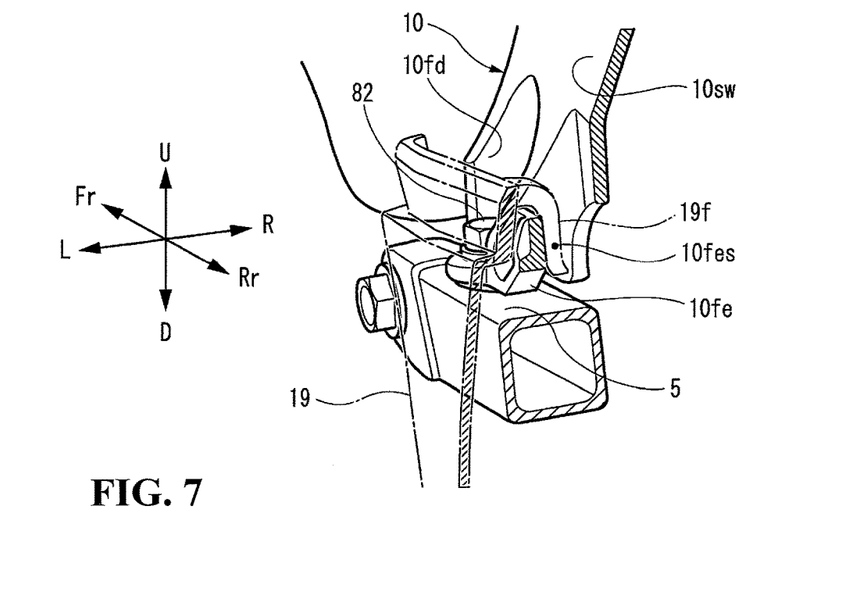
FIG. 7 is an enlarged perspective view of a mounting portion on a front side of the rider's seat shown in FIG. 6.

As shown in FIG. 7, the projecting lug 10fe adopts the structure where a hook 19f formed on an inner side of the side cover 19 which covers the side surface of the vehicle in a desired manner is engaged with the projecting lug 10fe. In this manner, the side cover 19 is hooked in the vicinity of the front portion mounting portion 10fd which is fixed by the mounting bolt 82. Thus, the side cover 19 can be stably supported.

As shown in FIG. 5, rear portion mounting holes 10rdh through which the mounting bolts 82 are threaded into the seat frames 5 are formed in the rear portion mounting portions 10rd of the seat support member 10. Downwardly extending portions 10rdc, which extend downward along side surfaces of the seat frames 5, are formed on the rear portion mounting portions 10rd on both left and right sides of the rear portion mounting holes 10rdh. With the provision of the downwardly extending portions 10rdc, at the time of mounting the seat support member 10 on the seat frames 5, the downwardly extending portions 10rdc can be hooked to left and right side surfaces of the seat frames 5 thus facilitating the positioning of the seat support member 10. Further, rear end extending portions 10re which extend rearwardly with a predetermined distance between the rear end extending portions 10re and the seat frames 5 are formed on rear ends 10r which form the other end portion of the seat support member 10 on both left and right sides.

Figure 8:
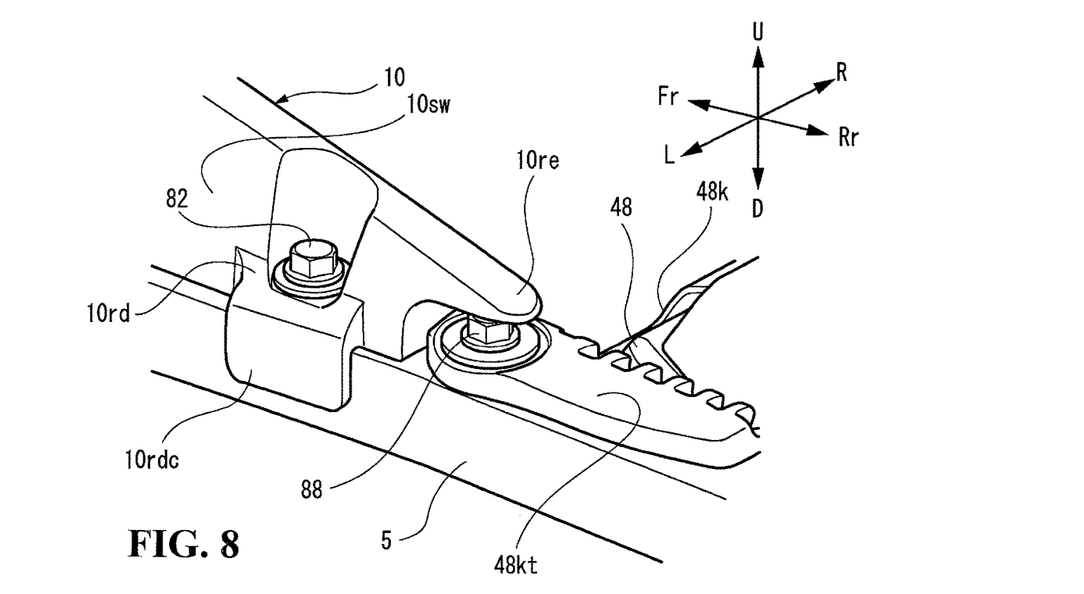
FIG. 8 is an enlarged perspective view of a mounting portion on a rear side of the rider's seat shown in FIG. 6.

As shown in FIG. 8, the rear end extending portion 10re is positioned in an overlapping manner in the vertical direction with a case fixing portion 48kt of a battery case 48k which stores a battery 48 arranged behind the seat support member 10 therein. The case fixing portion 48kt extends in the lateral direction of the battery case 48k such that the case fixing portion 48kt is placed on an upper end surface of the seat frame 5, and is fixed to the seat frame 5 using case fixing screws 88. Further, the rear end extending portion 10re is positioned just above the case fixing screw 88. Accordingly, the rear end extending portion 10re has a function of preventing the removal of the case fixing screw 88.

As described above, in this embodiment, the seat frames 5 are disposed in a frontwardly inclined manner toward the main frames 3 such that the seat frames 5 become away from the seat bottom surface 17b of the rider's seat 17 thus forming the space S below the seat bottom surface 17b, and the seat support member 10 can be disposed in the space S. As a result, the space S can be used as a part storage space and hence, the degree of freedom in layout of parts can be increased.

By forming the seat frames 5 in a straight line manner, different from the conventional case, the seat frames 5 can be formed of a single member without providing a connecting member. Accordingly, rigidity of the seat frames 5 can be increased. Further, by laying out the seat frames 5 in a straight line manner toward the main frames 3, compared to the conventional configuration where the seat frames are formed by connecting the horizontal member and the connecting member to each other, the seat frames 5 can be shortened. Thus, it is possible to realize the reduction of weight and the reduction of cost of the seat frames 5 in an attempt of acquiring predetermined rigidity.

Further, in this embodiment, the seat support member 10 is configured to gradually increase a height thereof toward the one end side 10f in the longitudinal direction of the vehicle as viewed in a side view of the vehicle and hence, the largest storage space Sp can be formed on the one end side 10f of the seat support member 10. Accordingly, a maximum storage amount can be ensured by using the largest storage space Sp as a part storage space.

In this embodiment, the largest storage space Sp is disposed between the seat support member 10 and the fuel tank 18. Thus, the rear side surface 18rw of the fuel tank 18 can be used as a partitioning wall surface of the largest storage space Sp on a front side. Further, the support seat surface 18b which supports the seat bottom surface 17b thereon is formed on the upper portion of the fuel tank 18. Thus, the seat bottom surface 17b can be used as a partitioning wall surface of the largest storage space Sp on an upper side. Accordingly, with respect to the largest storage space Sp, portions of the wall surfaces which partition the space are formed by making use of the fuel tank 18 and the rider's seat 17. Thus, the part storage space can be formed without providing particular members.

In this embodiment, the electric component 20 having heavy weight such as an electronic part is arranged in the largest storage space Sp and hence, heavy objects can be collectively arranged in the vicinity of the fuel tank. As a result, the concentration of heavy objects can be realized thus providing the vehicle having a favorable weight balance.

In this embodiment, the structure is adopted where the electric component 20 is disposed in the largest storage space Sp. However, other parts except for the electronic parts can be also disposed in the largest storage space Sp. For example, the structure may be adopted where a canister may be arranged just behind the fuel tank 18, that is, at a position corresponding to the ECU 21. When the structure where the canister is arranged is adopted, the fuel tank 18 and the canister are arranged adjacent to each other and hence, a length of a hose for connecting the fuel tank 18 and the canister to each other can be shortened thus providing the structure excellent in assembling property, maintenance property, and cost performance.

In this embodiment, the seat support member 10 includes the upper surface wall 10u extending in the lateral direction of the vehicle and the leg walls 10sw extending downwardly in the vertical direction of the vehicle from both left and right end sides of the upper surface wall 10u. Thus, the seat bottom surface 17b can be supported by the upper surface wall 10u in a face contact manner whereby the rider's seat 17 can be stably supported. Further, the leg walls 10sw are mounted on the seat frames 5. Thus, the seat support member 10 is directly fixed to the vehicle body frame 2 whereby the rigidity for supporting the rider's seat 17 can be increased.

As in the case of this embodiment, when the structure is adopted where the seat engaging portions 10k which engage with the seat bottom surface 17b are formed on the upper surface wall 10u of the seat support member 10, the seat bottom surface 17b can be surely engaged with the seat support member 10 so that it is possible to prevent the positional displacement of the rider's seat 17. Further, it is possible to acquire a positioning effect for the rider's seat 17 at the time of assembling and mounting the rider's seat 17 to and on the seat support member 10.

In this embodiment, the fuel injection device 45 is disposed below the upper surface wall 10u. Thus, the fuel injection device 45 can be protected by the seat support member 10.

In this embodiment, the air cleaner element 50 is disposed below the seat support member 10. Thus, the air cleaner element 50 can be protected by the seat support member 10. Further, the opening portion 10h is formed in the seat support member 10 at a position above the upper portion 50u of the air cleaner element 50. Thus, a space on an upper side of the air cleaner element 50 can be further increased thus improving intake efficiency.

In this embodiment, the fixing portion 10g on which the electric component 20 is mountable is formed on the seat support member 10 and hence, particular members for holding the electric component 20 in the storage space is not necessary whereby the number of parts can be reduced and the vehicle can be miniaturized.

Further, in this embodiment, the seat support member 10 is formed by molding using a fiber reinforced resin and hence, strength of the seat support member 10 can be increased and, at the same time, the weight of the seat support member 10 can be reduced. Further, due to the reduction of weight of the seat support member 10 arranged on an upper portion of the vehicle, lowering of heavy objects of the vehicle is accelerated thus providing the vehicle having a favorable weight balance.

Although one embodiment of the invention has been explained heretofore, the invention is not limited to the above-mentioned embodiment, and the embodiment can be modified in a desired manner. For example, the structures of the seat frame 5, the support frame 6, the main frame 3, the pivot frame 4 and the like are not limited to the structures shown in the drawings, and can be modified in a desired manner. Further, also a shape of the seat support member 10 and the structure of the seat bottom surface 17b are not limited to the above-mentioned embodiment, and can be modified in a desired manner.

In the above-mentioned embodiment, the seat support member 10 is formed by molding using a fiber reinforced resin. However, besides the fiber reinforced resin, a material for forming the seat support member 10 is not particularly limited provided that the material is light-weighted and has a high strength.

Further, in the above-mentioned embodiment, although the explanation has been made with respect to the motorcycle, the invention is also applicable to other saddle-ride-type vehicles such as a buggy.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A saddle-ride vehicle comprising:
a main frame extending rearwardly in a longitudinal direction of the vehicle and downwardly from a head pipe;
a seat frame extending rearwardly in the longitudinal direction of the vehicle from the main frame;
a rider's seat supported on the seat frame, said rider's seat includes a front portion and at least one engaging hook mounted on a seat bottom surface of the rider's seat, said at least one engaging hook being displaced rearwardly relative to the front portion of the rider's seat;
wherein the seat frame is disposed in a frontward inclined manner toward the main frame such that the seat frame extends away from the seat bottom surface of the rider's seat thus forming a space below the seat bottom surface;
a seat support member is disposed in the space, said seat support member includes an upper surface wall extending in a lateral direction of the vehicle, said upper surface wall includes at least one seat engaging portion for receiving the at least one engaging hook mounted on the seat bottom surface of the rider's seat for securing the rider's seat relative to the seat support member;
leg walls extending downward in a vertical direction of the vehicle from both left and right end sides of the upper surface wall, wherein said leg walls are mounted on the seat frame;
said seat support member is configured to increase in height toward a front side in the longitudinal direction of the vehicle;
the space has a storage space adjacent to the front side of the seat support member, wherein the storage space is disposed between the seat support member and a fuel tank; and
a front support seat surface for supporting the front portion of the seat is formed on an upper portion of the fuel tank.

2. The saddle-ride vehicle according to claim 1, wherein an electric component is arranged in the largest storage space.

3. The saddle-ride vehicle according to claim 1, wherein a fuel injection device is disposed below the upper surface wall.

4. The saddle-ride vehicle according to claim 1, wherein an air cleaner element is disposed below the seat support member; and
an opening portion is formed in the seat support member at a position where the seat support member faces an upper portion of the air cleaner element in an opposed manner.

5. The saddle-ride vehicle according to claim 1, wherein a fixing portion on which an electric component is mountable is formed on the seat support member.

6. The saddle-ride vehicle according to claim 1, wherein the seat support member is formed by molding using a fiber reinforced resin.

7. A seat frame for a saddle-ride vehicle comprising:
the seat frame extending rearwardly in a longitudinal direction of the vehicle from a main frame;
a rider's seat supported on the seat frame, said rider's seat includes a front portion and at least one engaging hook mounted on a seat bottom surface of the rider's seat, said at least one engaging hook being displaced rearwardly relative to the front portion of the rider's seat:
wherein the seat frame is disposed in a frontward inclined manner toward the main frame, wherein the seat frame is detachable from the seat bottom surface of the rider's seat thus forming a space below the seat bottom surface;
a seat support member is disposed in the space, said seat support member includes an upper surface wall extending in a lateral direction of the vehicle, said upper surface wall includes at least one seat engaging portion for receiving the at least one engaging hook mounted on the seat bottom surface of the rider's seat for securing the rider's seat relative to the seat support member;

leg walls extending downward in a vertical direction of the vehicle from both left and right end sides of the upper surface wall, wherein said leg walls are mounted on the seat frame;

said seat support member is configured to increase in height toward a front side in the longitudinal direction of the vehicle;

said space has a storage space adjacent to the front side of the seat support member, wherein the storage space is disposed between the seat support member and a fuel tank; and a front support seat surface for supporting the front portion of the seat is formed on an upper portion of the fuel tank.

* * * * *